UNITED STATES PATENT OFFICE.

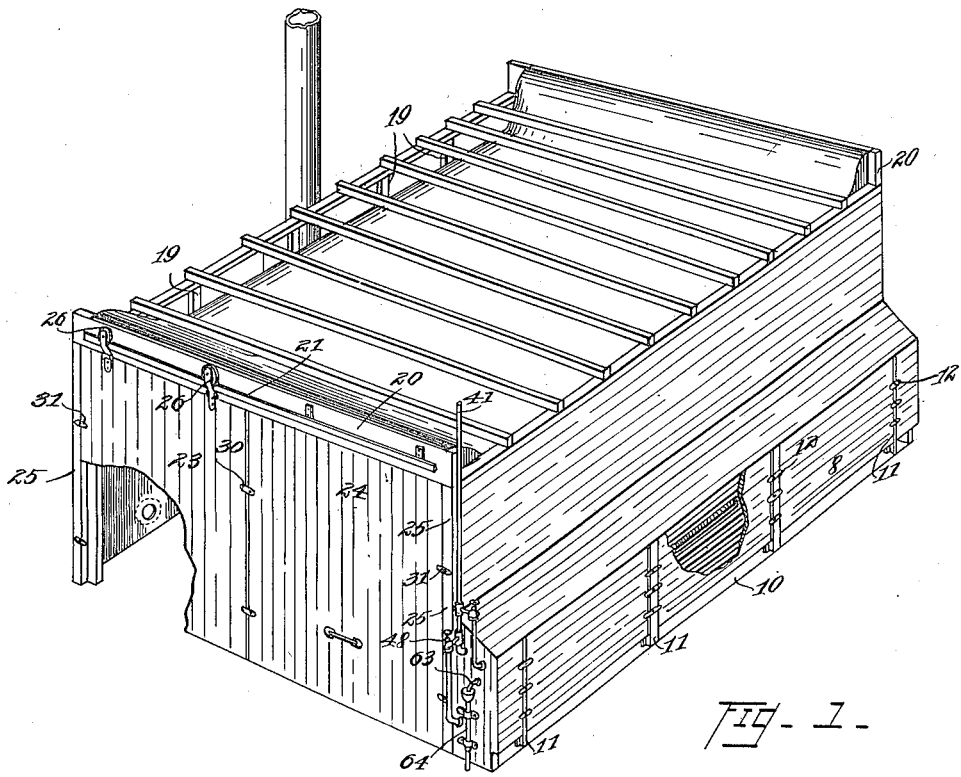

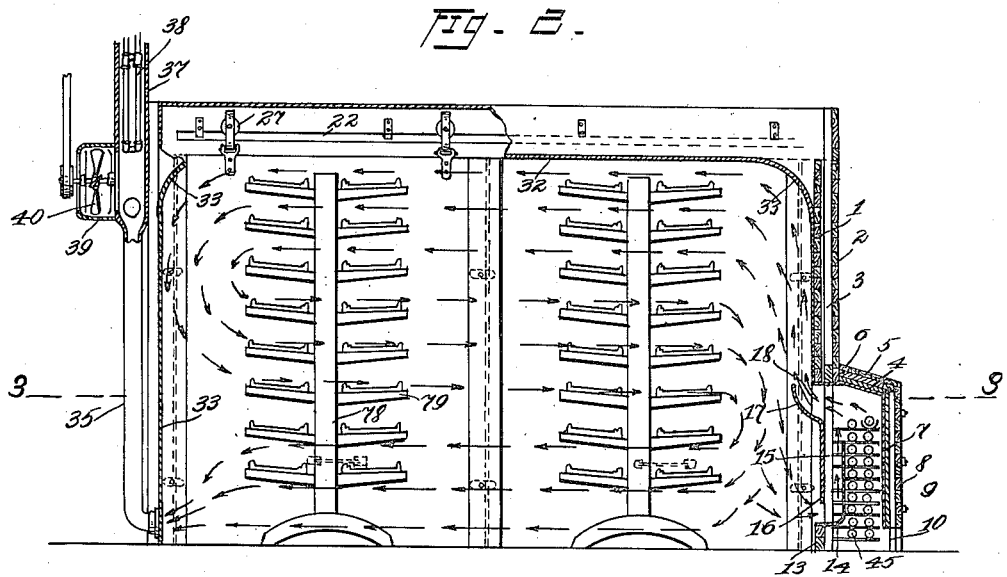

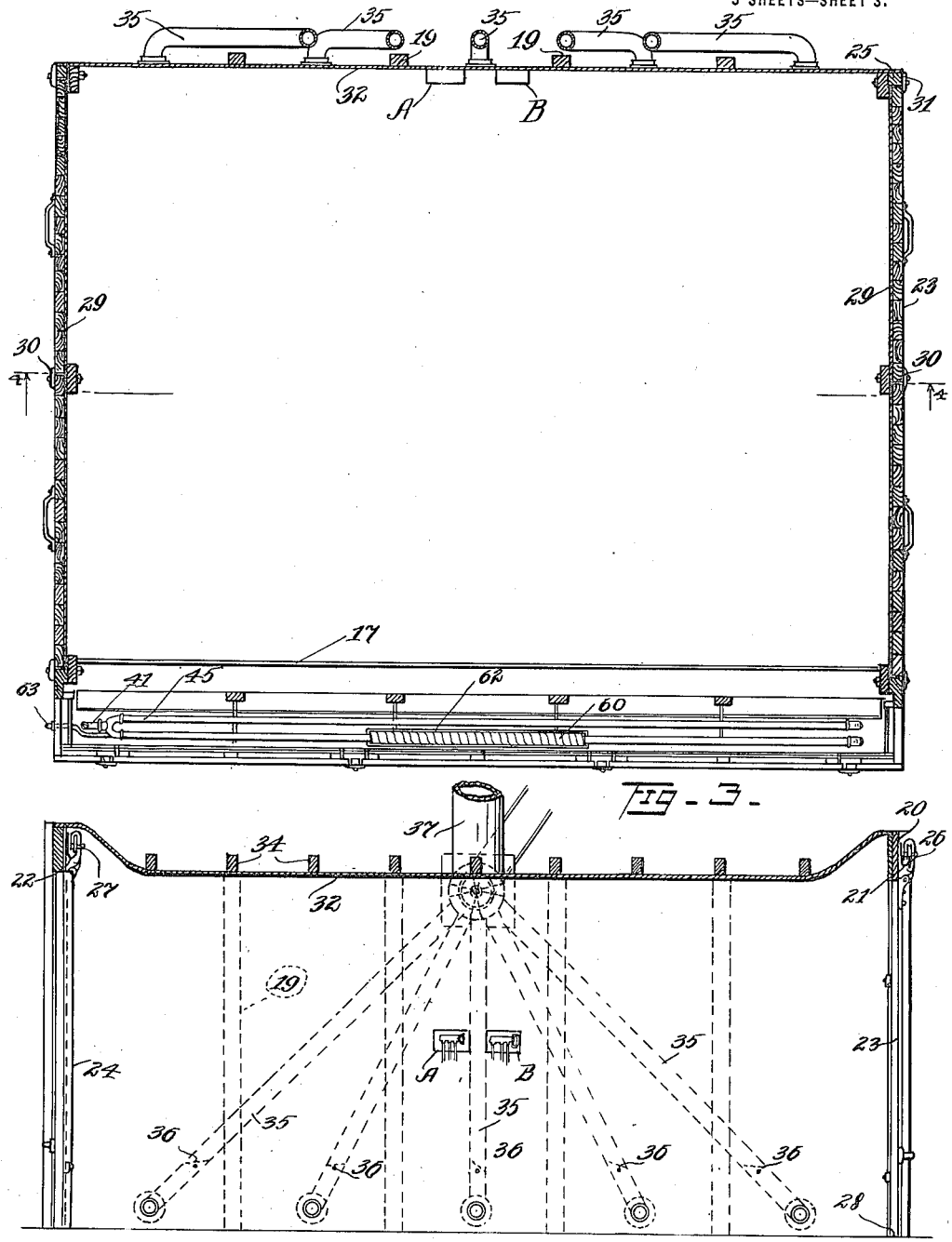

JOHN C. GILLETTE, OF LAKEWOOD, OHIO, ASSIGNOR TO THE GLIDDEN VARNISH COMPANY, OF CLEVELAND, OHIO, A CORPORATION OF OHIO.

VARNISH-DRYING OVEN.

1,176,957.   Specification of Letters Patent.   Patented Mar. 28, 1916.

Application filed March 31, 1913. Serial No. 757,757.

*To all whom it may concern:*

Be it known that I, JOHN C. GILLETTE, a citizen of the United States, residing at Lakewood, in the county of Cuyahoga and State of Ohio, have invented a certain new and useful Improvement in Varnish-Drying Ovens, of which the following is a full, clear, and exact description, reference being had to the accompanying drawings.

This invention relates to ovens for the drying of varnish or finishes of similar nature. As is well known, this "drying" consists in the absorption by the varnish of oxygen from the atmosphere, and in practice this result is secured by circulating air in contact with the exposed varnish, the oxygen in the air being gradually absorbed by the varnish during this circulation.

It is the general purpose of this invention to provide a construction of oven wherein this drying or oxidizing may be accomplished in a particularly efficient manner; wherein the air which is used for this purpose is fresh air, which is circulated through the oven at a rate which will insure the most efficient results; wherein the temperature and humidity of the air may be kept uniform, whereby uniformity and reliability in the drying operation will ensue; wherein the circulation itself will be effected in a manner calculated to secure a maximum drying efficiency from a given volume of circulating air.

Further objects of the invention are, generally, to provide an oven construction wherein the warming or heating of the air is effected in an economical manner and the temperature or humidity of the air are maintained substantially uniform; wherein means are provided for utilizing the exhaust air from the oven for the purpose of heating the building or plant in which the oven may be located; also to provide certain structural features whereby a particularly efficient and economical oven construction may be realized.

Still further and more generally speaking, the invention may be defined as consisting of the combinations of elements embodied in the claims hereto annexed and illustrated in the drawings forming part hereof, wherein—

Figure 1 represents a perspective view of an oven constructed in accordance with my invention; Fig. 2 a sectional view through the oven shown in Fig. 1; Fig. 3 a horizontal sectional view thereof, corresponding substantially to the line 3—3 of Fig. 2; Fig. 4 a vertical sectional view corresponding substantially to the line 4—4 of Fig. 3; Fig. 5 a sectional detail illustrating part of the thermostatic mechanism for controlling the temperature of the air within the oven; Fig. 6 a similar detail of a part of the mechanism which controls the humidity of the air within the oven; Fig. 7 a perspective view of the coil arrangement whereby the air is heated and moistened in transit to the drying chamber; and Fig. 8 a sectional detail of the humidifier.

The apparatus illustrated herein comprises generally an oven proper or drying chamber containing the racks on which the varnished articles are exposed to the action of the air, a heating chamber through which the air passes en route to the drying chamber, the heating chamber being arranged to discharge air into the drying chamber in such manner as to secure the efficient circulation of the air in the drying chamber; damper-controlled outlet pipes for controlling the rate of circulation of air in the drying chamber and for discharging the air, after it has served its drying or oxidizing purpose either into a stack or into a room or other apartment for the purpose of heating the same; and an efficient door construction whereby convenient access may be provided to the interior of the oven when desired, and a tight or leak-proof closure may be provided when such access is not desired; together with automatically operating means for controlling the temperature and humidity of the drying or oxidizing air.

For convenience of description, that end of the oven into which the heated air is supplied will be referred to as the "front" end, and the opposite end, from which the air is exhausted, will be described as the "rear" end, while the other vertical walls will be referred to as the sides. The oxidizing or drying chamber has the four walls referred to and a top wall. The detailed construction of these walls will now be explained.

The front wall of the oven has the air-heating chamber formed preferably as a part thereof. This front wall is an insulating wall, made preferably of two vertically extending portions 1 and 2, spaced apart, to provide an air space 3 therebetween. Projecting outwardly and downwardly from the bottoms of the wall portions 1 and 2 is the roof of the heating chamber. This roof comprises an inner wall 4 and an outer wall 5, preferably of wood, with suitable non-conducting material 6 therebetween. The outer wall of this heating chamber extends downwardly and, together with the roof, completes the front wall of the oven. The outer wall of the heating chamber comprises an inner portion 7 and an outer portion 8, preferably of wood, with an air space 9 therebetween. The outer wall of the heating chamber 7 terminates several inches above the floor or foundation on which the oven is supported to provide an air intake 10 which extends the full length of the heating chamber. The outer wall 8 of this heating chamber is preferably made of a plurality of panels interposed between vertically extending battens 11, which battens extend to the floor on which the oven rests and are provided with turn buttons 12 whereby the panels may be secured in place or may be removed, as occasion may require.

Vertically beneath the inner portion 1 of the front wall there is located a short wall or baffle 13, which is of substantially the same height as the air intake 10 and extends the full length of the oven and of the heating chamber. A sheet metal plate 14 is secured to the top of the baffle 13 and projects outwardly toward the front wall of the heating chamber and thence upwardly, whereby a vertically extending passageway 15 is provided between said plate and a metal plate 16 which extends vertically from a point several inches above the bottom of the plate 14 to a point several inches below the bottom of the wall 1, where it is bent or deflected inwardly, as shown at 17, to form an upwardly directed flue 18 for discharging air from both sides of the plate 14 in a vertical direction along the wall 1. Between the plate 14 and the wall 7 of the heating chamber the heating coils are arranged, which coils will be described hereinafter.

The rear wall of the oven is a heat-conducting wall, which is preferably formed by nailing a sheet metal lining to a plurality of vertical studs or joists 19. The side walls of the oven are provided with doors, and in the drawings I have shown the doors as comprising the entire end walls, and the construction whereby this result may be obtained will now be described. Each transverse plate 20 at the top of each side wall is provided with a pair of metal tracks 21, 22 thereon, the track 21 being located on the outside of the plate and the track 22 on the inside. These tracks extend substantially the full length of the plate. 23 and 24 represent a pair of doors which jointly close the entire side of the oven, covering the vertical distance included between the plate 20 and the floor and the horizontal distance between the corner posts 25. Each door 23 is provided with rollers 26 which coöperate with the track 21 on the outside of a plate 20, while each door 24 is provided with rollers 27 which coöperate in like manner with the bottom, to permit them to clear the doors 24, when it is desired to obtain access to the side of the oven covered by the first-mentioned doors, suitable expedients being employed to insure a tight joint between the bottom of the door and the floor. The ends of the tracks 21 and 22 which support their respective doors when the latter are in open position are slightly elevated above the opposite ends, whereby the doors will be raised slightly when opened. The doors are of wood and have a sheet metal lining 29 applied thereto, whereby the sides of the oven are of semi-insulating material. The doors may be retained in closed position by means of buttons 30 carried by one of the doors and adapted to overlap the meeting edge of the adjacent door and by buttons 31 carried by the sills 25 and adapted to overhang the outer edges of the doors.

Reference has been made to the lining of the drying chamber. This lining (indicated at 32) is of sheet metal, preferably galvanized iron, and, as shown in Fig. 2, extends along the inner face of the insulating wall at the front of the chamber and is curved, as shown at 33, at the front and rear upper corners of the oven chamber to prevent pocketing the air and facilitate the circulation thereof. The top wall of the chamber is composed of battens 34, to which the lining 32 is attached, as by nailing, whereby a heat conducting wall is provided at the top of the oven as well as at the rear thereof.

Communicating with the rear wall near the bottom thereof are a plurality of pipes 35 each having a damper 36 therein (indicated in dotted lines in Fig. 4). Five such pipes are shown, the lower ends of the pipes communicating with the drying chamber through the rear wall in such manner as to secure a substantially even distribution of the exhaust air through such pipes from end to end of the floor of the chamber. These pipes converge at their upper ends into a stack 37, and this stack is provided with a heating coil 38, whereby, when it is not desired to utilize the escaping warm air for other purposes, a circulation may be produced through the oven and out through the stack. In cold weather, however, it may well be desirable to utilize the otherwise waste heat in the air which has passed through the oven. For this purpose, I provide a fan casing 39 which communicates with the bottom of the stack, immediately above the upper ends of the pipes 35, and place in said housing a fan 40, which can serve not only to facilitate the circulation of air through the oven but to discharge the heated air into the compartment wherein the oven may be located.

Reference has been made to the heating coil. This coil is shown in place in the heating chamber in Figs. 1 and 2 and is shown in perspective in Fig. 7. 41 denotes a pipe through which heating fluid, preferably steam, is supplied to the coil within the heating chamber. This pipe is provided with two branches 42 and 43, the one leading to a double coil comprising the pipes 44 in the upper part of the heating chamber and the other leading to the pipes 45 in the lower part of the heating chamber. There are shown in the drawings six horizontal pairs of pipes 44 and four horizontal pairs of pipes 45. The bottom of the coil comprising the pipes 44 discharges through an outlet pipe 46, while the bottom of the coil comprising the pipes 45 discharges into this same outlet pipe, through a check valve 47. A valve 48 in the pipe 41, between the connections 42 and 43, enables the lower coil to be put into and out of commission whenever desirable. The lower coil is provided for the purpose of assisting the main coil thereabove in raising the temperature of the incoming air and of the drying chamber to the desired degree. After this preliminary operation has been accomplished, the valve 48 may be closed, which will cut out the auxiliary heating coil. The check valve 47 prevents any fluid escaping from the main or upper coil from entering the lower coil.

For the purpose of maintaining the temperature within the oven substantially uniform, a valve 49 is provided in the pipe 41, which valve is operated by a diaphragm chamber 50, the diaphragm being actuated by means of compressed air supplied through a pipe 51. The supply of air through this pipe and the deflection of the diaphragm thereby to operate the valve 49 is controlled by a thermostat, indicated generally at A in Figs. 3 and 4 of the drawing, and in detail in Fig. 5 and comprising a base plate 52 on which there is mounted a valve casing 53 having a longitudinal bore wherein there is mounted a valve 54. This valve is provided with an elongated recess 55 forming a chamber with the adjacent inner surface of the valve casing. Connected to the valve casing is a pipe 56 which, when the valve 54 moves in one direction, communicates with one end of the chamber, and an exhaust pipe 57 which, when the valve moves in the opposite direction, communicates with the opposite end of the chamber. A pipe 51, arranged intermediate between the pipes 56 and 57, is in constant communication with the chamber. One end of the valve 54 is connected by means of the toggle links 58 to a transverse bar 59 of highly expansible metal. The parts are so proportioned and arranged that, when the temperature in the drying chamber exceeds a predetermined degree, the expansion of the metal bar 59 straightens the toggle links and moves the valve to the position shown in Fig. 5, whereby compressed air through the pipe 56 may flow into the pipe 51, flex the diaphragm, and close the valve 59. When the temperature falls below a predetermined limit, the contraction of the metal strip or bar 59 throws the knuckle of the toggle to the left and causes the valve 54 to close the end of the pipe 56 and place the end of the pipe 57 in communication with the chamber 55, whereby the pressure in the pipe 51 may be relieved through the pipe 57 and the diaphragm be permitted to flex in a reversed direction to open the valve 49.

As is well known, not only the temperature, but the humidity of the air entering the oven should be kept uniform in order to secure uniformity and efficiency in drying or oxidizing the varnish. For the purpose of so controlling the humidity of the air, a humidifier and a humidostat are provided in conjunction with the heating coil. The humidifier is shown in Figs. 2, 7 and 8 and comprises generally an absorbent covering 60 for one of the heating pipes 44, with a pipe 61 adapted to lead steam thereto from the supply pipe 41. The pipe 61 extends parallel with one of the branches of the pipe 44, is embodied in the absorbent 60 and is perforated for the distribution of steam and water of condensation into the absorbent covering. Partly surrounding this absorbent covering is a metallic trough 62 having a drain pipe 63 leading therefrom and discharging into a funneled discharge pipe 64.

For the purpose of controlling the supply of fluid to the absorbent, I employ a humidostat, which I have indicated generally at E in Figs. 3, 4, and 8. This humidostat operates on the same principle as the thermostat and comprises generally a base plate 65 having a valve casing 66 thereon provided with a bore in which there is mounted a valve rod 67 having a portion cut away to provide a recess therein facing the inner wall of the valve casing to provide a chamber 68. 69 denotes a compressed air supply pipe which is adapted to communicate with one end of the chamber 68, 70 an exhaust pipe adapted to communicate with the opposite end of the chamber 68 when the valve 67 is moved a sufficient distance, and 71 an intermediate pipe leading to the diaphragm chamber 72 and adapted to flex the diaphragm therein to close the valve 73 in the pipe 61 when the air pressure in the pipe 71 reaches a predetermined point. One end of the valve rod 67 is connected to the adjacent ends of the arms 74 of a pair of angle levers, the other arms 75 of said levers being connected by a spring 76 which tends to throw the arms 74 and the valve 67 attached thereto to the left. Between the arms 75 there is interposed a block 77, of wood or other material which is adapted to swell in the presence of moisture. When the saturation of the air in the heating chamber exceeds a predetermined degree, the swelling or expansion of the block 77 will pull the valve 74 to the right, allow compressed air to flow through the pipe 71 into the pipe 61, and close the valve 73 and thereby shut off the supply of steam to the humidifier. When the humidity of the air falls below a predetermined point, the contraction of the block 77 permits the reverse movement of the lever arms and of the valve, and the pressure on the diaphragm controlling the steam in the pipe 61.

The detailed construction of the oven given hereinbefore is exceedingly important in securing such a circulation of the air as will enable the varnish to be efficiently dried or oxidized. The air entering through the elongated inlet 10 is warmed by passing through and in contact with the coil in the heating chamber. The heated air passes through the vertically extending flue 18 and rises along the front wall of the oven drying chamber, in contact with the lining 32. A column or stratum of air the full length of the oven thus rises vertically and is directed by the rounded or concaved part 33 of the lining along the roof. In passing under this roof, owing to the heat-conducting qualities of the latter, the air is cooled and, upon reaching the opposite end of the roof, under the influence of gravity and the rounded or concaved end 33 of the lining, it drops, in the manner indicated by the arrows, and flows from the rear to the front of the drying chamber, beneath the upper stratum, which is moving in the reverse direction. In passing in contact with the varnish and with the lower stratum of air, it is still further cooled and drops to the bottom of the oven and passes from the front to the rear of the drying chamber in a third stratum until it reaches the rear wall, where it passes out through the pipes 35. In connection with this circulation of the air, I employ drying racks such as are shown in Fig. 2, said racks comprising generally vertically extending pillars 78 having substantially horizontal shelves 79 thereon. This arrangement enables the air to flow in its S-shaped, stratified course, without any interruption by the articles in its way.

The purpose of the flue formed between the walls 14 and 16 is to prevent the formation of a dead-air pocket near the front and bottom of the drying chamber. Any air that tends to accummulate and be pocketed at this place will be entrained by the upwardly moving current of air between the wall 14 and the inner wall of the heating chamber and will be carried upward with the entering air, in the manner shown by the arrows in Fig. 2. This not only prevents the formation of a dead air pocket, but preserves the particular kind of air-circulation which I have found to be extremely efficient, and effects a considerable saving in heat. The stratification of the air, which is one of the objects to be secured by my construction, is enhanced by the semi-insulating construction provided in the end walls of the drying chamber, whereby the formation of cross or eddy currents in this vicinity is prevented. If the air be handled too rapidly, this circulation will be broken.

Among the advantages which result from the oven construction set forth herein are:—
(1) A particularly efficient handling of the air whereby a maximum drying or oxidizing effect may be obtained. (2) The employment of fresh, heated air for the drying or oxidizing effect, as distinguished from the repeated circulation of the same air as employed in other constructions with which I am familiar. (3) Efficiency and economy in heating the air. (4) Automatic control of the temperature and humidity of the air, with attendant uniformity of operation. (5) Efficient control of the circulation. (6) The utilization of exhaust air for heating puroposes. (7) General efficiency of operation and economy of production.

The foregoing results are all realizable by the oven construction disclosed herein; but, while I have necessarily described the oven in detail, I do not propose to be limited to such details except as they may be positively included in the claims annexed hereto or may be rendered necessary by the prior state of the art.

Having thus described my invention, what I claim is:

1. In an apparatus of the character set forth, the combination of a substantially unobstructed drying chamber, means for supplying air thereto, and means formed with the chamber walls for producing a stratified circulation of the air in reverse directions from end to end of said chamber.

2. In an apparatus of the character set forth, the combination of a substantially unobstructed drying chamber, means for supplying heated air thereto, and means formed with the chamber walls for producing a circulation of the air through said chamber in strata of varying temperature.

3. In an apparatus of the character set forth, the combination of a drying chamber having a front wall of insulating material and a top wall and a rear wall of conducting material and side walls of semi-insulating material, said front wall having an inlet for warm air extending substantially the length thereof and the rear wall having an outlet for exhaust air near the bottom thereof and extending substantially the length of the rear wall.

4. In an apparatus of the character set forth, the combination of a drying chamber having a front wall of insulating material and a top wall and a rear wall of conducting material, the front wall having an inlet for warm air, and the rear wall having an outlet for exhaust air.

5. In an apparatus of the character set forth, the combination of a drying chamber having a front wall, a heating chamber adapted to discharge warm or heated air through said front wall in a vertically ascending column and substantially the full length of said wall, and means whereby said column of air may be circulated along the upper wall of the chamber, thence downwardly and back between the top and bottom walls of the chamber to the front thereof and thence along the bottom of the chamber to the rear wall thereof.

6. In an apparatus of the character set forth, the combination of a drying chamber having a wall, a heating chamber adapted to discharge warm or heated air through said wall, and means whereby said air may be circulated along the upper wall of the chamber, thence downwardly and back between the top and bottom walls of the chamber to the first-mentioned wall thereof and thence along the bottom of the oven in a reverse direction.

7. In an apparatus of the character set forth, the combination of a drying chamber having a front wall of insulating material and a top and a back wall of conducting material, means for discharging a column of heated air through the front wall, below the top thereof and substantially throughout the length of said wall, and an outlet from the chamber communicating with the rear wall near the bottom thereof and adapted to remove the air from the chamber throughout substantially the full length of the bottom thereof.

8. In an apparatus of the character set forth, the combination of a drying chamber having a front wall, a heating chamber adapted to discharge warm or heated air through said wall at a point above the bottom thereof, and a flue extending from the interior of said drying chamber into the heating chamber, said flue communicating with said drying chamber at a point near the bottom of the front wall.

9. In an apparatus of the character set forth, the combination of a drying chamber having a front wall, a heating chamber provided with an air inlet and a flue for discharging heated air through said front wall above the bottom thereof, said heating chamber also having a flue communicating with the drying chamber near the lower part thereof and extending upwardly and discharging into the first mentioned flue.

10. In an apparatus of the character set forth, the combination of a drying chamber having a front wall, a heater comprising a chamber forming a lateral extension of the front wall and provided near its lower end with an air inlet, air heating means in said chamber, a flue extending from the air heating chamber through the front wall of the drying chamber, and a flue interposed between the front wall of the drying chamber and the air heating chamber and communicating at its lower end with the drying chamber and at its upper end with the first mentioned flue.

11. In an apparatus of the character set forth, the combination of a drying chamber having a front wall, means for supplying heated air through the front wall of the chamber, and means depending upon the employment of chamber walls of varying combativities for producing a horizontal circulation of air in said chamber at a level beneath the air inlet.

12. In an apparatus of the character set forth, the combination of a drying chamber having a front wall, a heating chamber projecting laterally from said front wall and having a heater therein, there being a vertically extending partition between the heater and the drying chamber, said partition having its lower end laterally extended toward the drying chamber, a second partition in substantially vertical alinement with the front wall of the drying chamber and having its lower wall spaced from the lateral extension of the first partition and having a lateral extension projecting inwardly to form a flue for supplying air along side the inner surface of the front wall of the drying chamber.

13. In an apparatus of the character set forth, the combination of a drying chamber having a front wall, an air heating chamber having a housing projecting from the lower end and constituting a lateral extension of the said front wall and having an air inlet opening at its bottom extending substantially the full length thereof, a partition extending upwardly from the bottom of the drying chamber, in substantial alinement with the front wall thereof, an outwardly and upwardly projecting partition extending from the upper end of the first mentioned partition, a heater in the space provided between the last mentioned partition and the outer wall of the heater casing, and a third partition in substantially vertical alinement with the first mentioned partition and having its lower end spaced therefrom and having its upper end deflected inwardly and upwardly to form a flue discharging into the air circulating chamber.

14. In an apparatus of the character set forth, the combination of an air circulating chamber, and an air heating chamber communicating therewith and substantially the full length thereof, the last mentioned chamber being provided with a heater and having an outer wall the lower end whereof is provided with a substantially continuous air inlet substantially the full length of said chambers.

15. In an apparatus of the character set forth, the combination of an air circulating chamber having a vertical wall formed with an inlet extending substantially the full length and between the top and bottom thereof, a heating chamber communicating with said inlet and having at its lower end an air supply extending substantially the full length thereof, and a heating coil in said heating chamber extending substantially the full length thereof and interposed between the top and bottom thereof.

16. In an apparatus of the character set forth, the combination of an air circulating chamber, means for supplying heated air thereto, means depending upon the varying combativities with the variation of heat between different portions of the chamber walls, whereby such air may be circulated back and forth in horizontal strata, and racks in said chamber having vertically spaced supports thereon.

17. In an apparatus of the character set forth, the combination of an air circulating chamber, means for supplying heated air thereto, and means depending upon the varying combativities with the variation of heat between different portions of the chamber walls, whereby such air may be circulated back and forth in horizontal strata, the temperature whereof decreases progressively from the top to the bottom of the chamber.

18. In an apparatus of the character set forth, the combination of an air circulating chamber, means for supplying heated air thereto, means whereby said air may be circulated through the chamber, an outlet duct for conducting the air from said chamber, a fan casing connected with said duct, and an exhaust fan therein.

19. In an apparatus of the character set forth, the combination of an air circulating chamber, means for supplying heated air thereto, means whereby said air may be circulated through the chamber, an outlet duct for conducting the air from said chamber, a flue, and means whereby the air may be discharged from said duct into said flue or into the atmosphere surrounding the chamber.

20. A varnish drying oven, comprising an air circulating chamber, an air heating chamber adapted to discharge heated air thereinto, a heating coil in said second chamber, a valve for controlling the flow of heating fluid through said coil, a thermostat in said first chamber and connections whereby said thermostat may control said valve.

21. In an apparatus of the character set forth, the combination of an air circulating chamber, an air heating chamber communicating therewith, a heating pipe in the last mentioned chamber, an absorbent applied to the heating pipe in said air heating chamber, a pipe for supplying moistening fluid to the absorbent, and means, operative by the saturation of the air in the circulating chamber, for controlling the supply of fluid to the absorbent.

22. A varnish drying oven comprising an air circulating chamber, an air heating chamber communicating therewith, means for delivering vapor to said second chamber at a point between said heating means and the point of communication between said chamber, a thermostat and humidostat located in said first chamber adjacent to each other and controlling respectively said heating coils and said vapor delivering means.

23. In a varnish drying oven an air circulating chamber, an air heating chamber having therein a heating coil and adapted to discharge heated air into the first mentioned chamber, a thermostat in the air circulating chamber, connections whereby said thermostat may control the supply of heating fluid to the coil, an air moistener in the heating chamber including a fluid supply pipe, and a humidostat located in said air circulating chamber at a point adjacent to said thermostat for controlling the flow of fluid through the last mentioned pipe.

24. In an apparatus of the character set forth, the combination of an air circulating chamber having front and rear walls, means for circulating heated air from end to end thereof, and doors of semi-insulating material for the sides of the circulating chamber, the front wall of the chamber being of insulating material and the top and rear walls being of conducting material, and the rear wall being provided with an outlet near the bottom thereof.

25. In an apparatus of the character set forth, the combination of an air circulating chamber having front and rear ends and side doors, and means for circulating heated air from end to end thereof, said doors being of semi-insulating material, the front wall of the chamber being of insulating material and the top and rear walls being of conducting material.

In testimony whereof, I hereunto affix my signature in the presence of two witnesses.

JOHN C. GILLETTE.

Witnesses:
J. B. HULL,
BRENNAN B. WEST.